(12) United States Patent
Yuda et al.

(10) Patent No.: US 7,184,734 B2
(45) Date of Patent: Feb. 27, 2007

(54) RADIO COMMUNICATION APPARATUS

(75) Inventors: Yasuaki Yuda, Kanagawa (JP);
Takaaki Kishigami, Tokyo (JP);
Takashi Fukagawa, Kanagawa (JP);
Keiji Takakusaki, Kanagawa (JP);
Shoji Miyamoto, Miyagi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 10/714,119

(22) Filed: Nov. 14, 2003

(65) Prior Publication Data

US 2004/0142729 A1 Jul. 22, 2004

(30) Foreign Application Priority Data

Nov. 14, 2002 (JP) ............................. 2002-330550
Nov. 5, 2003 (JP) ............................. 2003-375424

(51) Int. Cl.
*H04B 1/06* (2006.01)
*H04B 1/00* (2006.01)
*H04K 9/00* (2006.01)
*H04L 1/00* (2006.01)

(52) U.S. Cl. .................. 455/269; 455/275; 455/276.1; 455/63.4; 455/296; 455/65; 375/316; 375/346; 375/349; 375/226

(58) Field of Classification Search ............... 455/561, 455/562.1, 67.11, 67.16, 269, 275, 276.1, 455/289, 290, 63.1, 63.4, 65; 342/174, 378; 343/853; 375/316, 346, 349
See application file for complete search history.

(56) References Cited

U.S. PATENT DOCUMENTS 5,530,449 A * 6/1996 Wachs et al. ............... 342/174
6,064,338 A * 5/2000 Kobayakawa et al. ...... 342/378
6,115,406 A * 9/2000 Mesecher .................... 375/130
6,191,736 B1 * 2/2001 Yukitomo et al. ........... 342/383
6,320,899 B1 * 11/2001 Chang et al. ................ 375/147
6,333,934 B1 * 12/2001 Miura ......................... 370/441
6,448,939 B2 * 9/2002 Maruta ........................ 343/853
6,466,166 B2 * 10/2002 Nakagawa .................. 342/378
6,708,020 B1 * 3/2004 Hiramatsu et al. ............ 455/65
6,762,717 B2 * 7/2004 Hirabe ......................... 342/368
6,870,878 B1 * 3/2005 Doi et al. .................... 375/226
2003/0236107 A1 * 12/2003 Azuma ........................ 455/561

FOREIGN PATENT DOCUMENTS

JP      2002-077016       3/2002

OTHER PUBLICATIONS

Takakusaki, Keiji, et al., "Background Calibration Method for Array Antenna and its Performance," Technical Report of IEICE, SST2001-78, A P 2001-226, RCS2001-261 (2002-03), pp. 113-118 (w/ partial English Abstract and partial English Translation).

* cited by examiner

*Primary Examiner*—Duc M. Nguyen
(74) *Attorney, Agent, or Firm*—RatnerPrestia

(57) ABSTRACT

A radio communication apparatus using an array antenna has a plurality of reception branches for conveying reception signals received at the antenna element of the array antenna, and a calibration branch for selecting one of the plurality of reception branches and conveying the reception signal. Channel estimations are made respectively on the reception-branch signals and a calibration-branch signal. RAKE composition is made on the channel estimation values, a result of which is used to detect amplitude and phase deviations on the reception branch thereby carrying out a correction.

24 Claims, 13 Drawing Sheets

RADIO COMMUNICATION APPARATUS

FIELD OF THE INVENTION

This invention relates generally to radio communication apparatuses for mobile radio communications systems, and more particularly to a radio communication apparatus using an array antenna.

BACKGROUND OF THE INVENTION

The adaptive array antenna technology for directive transmission/reception is known as an art that realizes to increase traffic capacity, expand communications areas, suppress interference, along with the increasing demands for the mobile communications systems. The adaptive array antenna technology is an art having an array antenna constituted by a plurality of antenna elements in order to suitably place transmission/reception directivity under control by the use of the signals received by the array antenna, together with the other pieces of information.

Studies have been made on a variety of approaches to the directivity control on the adaptive array antennas. For example, there is an approach to estimating the arrival direction of a reception signal such that directivity is placed under control toward the estimated direction. In this approach, it is known that, where there is a deviation in amplitude/phase on the array antenna at between the reception branches, there encounters a deterioration in the accuracy of direction estimation and distortion in the pattern of directivity. This results in an impossibility to secure a desired effect.

The amplitude/phase deviation at between reception branches results from the characteristic difference between analog elements of a radio circuit section. Hence, there is a difficulty in suppressing the occurrence of such deviations. Meanwhile, the amplitude/phase deviations vary from time to time due to the effect of aging, temperature change and so on. Thus, there is a need for a calibration technique for correcting for amplitude/phase deviations occurred between the reception branches, moreover a calibration technique for correcting for deviations varying in real time without requiring to shut down the communications system.

The configuration described in JP-A-2002-77016 is known as a prior art concerning calibration technique. In this configuration, the signals received at the array antenna are added with by a reference signal generated by a reference signal generator at the inside of a base station. Then, the reference signal is removed from the signal sent through the radio circuit section of each reception branch, to detect information of an amplitude-and-phase deviation over the reception branch. The detected information is used to effect calibration.

Meanwhile, there is a calibration technique using only reception signals without applying interference signals, in "Background Calibration Method for Array Antenna and its Performance" by Keiji Takakusaki, et al (IEICE Technical Report, RCS2001-261, March 2002). According to the document, a calibration branch based on a radio circuit section 1003C is provided for reception branches based on radio circuit sections 1003-1, 1003-2, . . . , 1003-N, as shown in FIG. 1. The signals received at each Of the antenna elements of the array antenna 1001 are used, to detect channel estimation values on the reception branches by a correlator 1005-1 and channel estimating unit 1006-1 and on the calibration branch by a correlator 100SC-1 and channel estimating unit 1006C-1. A correction-value detecting unit 1010 compares between the channel estimation values, thereby detecting amplitude/phase information on the reception branches. Using the detection information, correction values are read out from a correction-value memory unit 1011, thereby calibrating the reception signals in an inter-array signal compositing unit 1012. Selector units 1004-1, 1004-2 selects a signal from a predetermined antenna element of the array antenna 1001, under control by a selector control unit 1013.

However, in the related art described in JP-A-2002-77016, the reference signal acts as a signal interfering with reception signals. This results in reception characteristic deterioration.

Meanwhile, in the related art of FIG. 1, where the reception signal has a small power, the power on the calibration branch is rendered further smaller, thereby deteriorating the accuracy in the channel estimation value on the calibration branch. This causes deterioration in the accuracy of a correction value computed by using the relevant channel estimation value.

SUMMARY OF THE INVENTION

According to the present invention, RAKE composition is made on channel estimation values of both the reception branch and the calibration branch by using a channel estimation value of the reception branch, and the result is used to detect a correction value. With such a configuration, it is possible to accurately detect a correction value by virtue of path diversity gain.

DESCRIPTION OF THE PREFERRED EMBODIMENTS

Exemplary embodiments of the present invention are demonstrated hereinafter with reference to the accompanying drawings.

1. First Exemplary Embodiment

Figure 2:
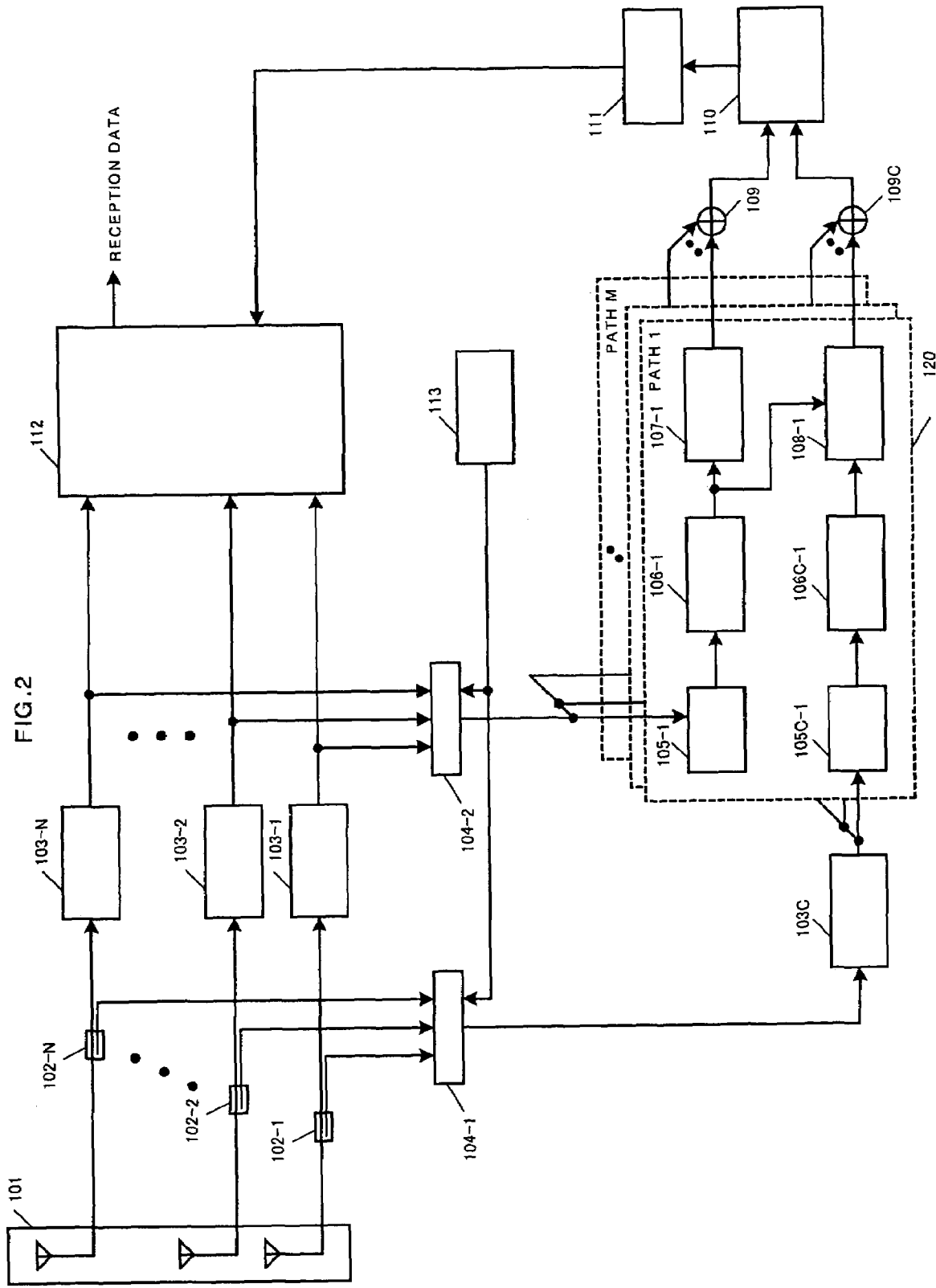
FIG. 2 is a block connection diagram of a radio communication apparatus according to embodiment 1 of the present invention.

FIG. 2 is a block connection diagram of a radio communication apparatus in embodiment 1 of the present invention. There are provided amplitude/phase deviation detecting systems 120 in the number of M corresponding to the number of paths, each of which comprises correlators 105-1 and 105C-1, channel estimating units 106-1 and 106C-1, power detecting unit 107-1 and an operating unit 108-1.

Now, explanation is made on the receiving operation on an assumption that the radio communication apparatus having a configuration of FIG. 2 is applied to a CDMA communications system.

An array antenna 101 is made up by a plurality of antenna elements. The antenna elements herein are assumably in the number of N. For the adaptive array antenna, receiving systems are configured in the number of N corresponding to the antenna elements, which are herein referred to as reception branches. On each reception branch, there are provided radio circuit sections 103-1, 103-2, ..., 103-N respectively connected to the plurality of antenna elements. Transmission lines or the like are employed for line connections. The radio circuit section 103-1, 103-2, ..., 103-N has the functions of processing to frequency-convert the signal received at the antenna into a base-band or intermediate frequency, to adjust for amplitude level of the received signal, to convert the received analog signal into a digital signal, and so on. The signals of the reception branches are inputted to an inter-array signal compositing unit 112. In the inter-array signal compositing unit 112, a plurality of input signals are adaptively processed to output preferable reception data. In this state, the input signals to the inter-array signal compositing unit 112 have amplitude variations and phase rotations caused by the characteristic of the reception branches. Because of the difference in amplitude variation and phase rotation between the reception branches, an amplitude/phase deviation results in between the input signals.

On each reception branch, a power distribution unit 102-1, 102-2, ..., 102-N is arranged in a position close to the antenna element of the array antenna 101 so that a slight power of a signal received at the antenna element can be distributed and outputted to a selector unit 104-1. The selector unit 104-1 selects one out of the input signals in the number of N according to a control signal from the selector control unit 113, and outputs it to a radio circuit section 103C. The radio circuit section 103C is similar to the radio circuit section 103-1, 103-2, ..., 103N on the reception branch. Herein, this reception system is referred to as a calibration branch. The calibration branch has an output signal having an amplitude variation and phase rotation caused by the characteristic of the calibration branch.

The output signals of the reception-branch radio circuit sections 103-1, 103-2, ..., 103-N are inputted also to a selector unit 104-2. The selector unit 104-2 selects and outputs one out of the input signals in the number of N, according to a control signal from the selector control unit 113. The selector control unit 113 outputs a selector control signal such that a reception branch to be selected and selection-operating timing are matched between the selector unit 104-1 and the selector unit 104-2. Meanwhile, selecting the reception branches under selector control may be in a predetermined sequence or in a desired order. Also, selector control may be made at a predetermined time interval or at a desired time interval.

It is herein assumed that in the selector control unit 113 the signal of the n-th branch is placed under control to be output. Meanwhile, because there are a plurality of incoming signals different in propagation time to the n-th antenna, these signals have respective propagation passages assumably taken as a first path, ..., M-th path.

The signal outputted from the selector unit 104-2 is the signal received at the n-th antenna, which is inputted to the correlators 105-1, ..., 105-M. In the correlator 105-1, ..., 105-M, correlation operation is made on the signal propagated over the M-th path and arrived at the antenna, in timing with receiving each signal. Due to this, the correlators 105-1, ..., 105-M respectively extracts the signals propagated over the first path, ..., the M-th path received at the n-th antenna. The processing in the correlator 105-1, ..., 105-M corresponds to inverted spread process.

The channel estimating unit 106-1, ..., 106-M makes a channel estimating process by the use of the output signal of the correlator 105-1, ..., 105-M. Due to this, the channel estimating unit 106-1, ..., 106-M outputs a complex number representative of channel estimation value of the signal propagated through the first path, ..., the M-th path. The channel estimation value includes an amplitude variation and phase rotation due to the fading variation which the signal has undergone over the path, and an amplitude variation and phase rotation caused by the reception branch.

The power detecting unit 107-1, ..., 107-M detects a power over the path by the use of a channel estimation value outputted from the channel estimating unit 106-1, ..., 106-M. For detection, there is a method of multiplying the channel estimation value outputted from the channel estimating unit 106-1, ..., 106-M by a conjugate complex number of the same channel estimation value. An adder 109 adds together the output signals of the power detecting units 107-1, ..., 107-M. Namely, by the power detecting units 107-1, ..., 107-M and the adder 109, RAKE composition is made on the channel estimation values for the paths outputted from the channel estimation units 106-1, ..., 106-M.

The signal received at the n-th antenna is further selected by the selector unit 104-1, and inputted to the correlators 105C-1, ..., 105C-M. The correlator 105-1, ..., 105C-M carries out a correlation operation on the signal propagated through the first path, ..., or M-th path and arrived at the antenna, in timing with receiving the signal.

The channel estimating unit 106C-1, ..., 106C-M makes a channel estimating process by the use of an output signal of the correlator 105C-1, ..., 105C-M. Due to this, the channel estimating unit 106C-1, ..., 106C-M detects a channel estimation value on the signal propagated through the first path, ..., or M-th path. The channel estimation value includes an amplitude variation and phase rotation due to a fading variation undergone over the path, and an amplitude variation and phase rotation due to the calibration branch.

The operation unit 108-1, ..., 108-M designated at 108 detects an amplitude ratio and phase rotation amount of a channel estimation value of calibration branch relative to a channel estimation value of reception branch, by the use of a channel estimation value of calibration branch outputted from the channel estimating unit 106C-1, ..., 106C-M and a channel estimation value in the reception branch over the same path outputted from the channel estimating unit 106-1, ..., 106-M. For detection, there is a method of multiplying the channel estimation value of calibration branch outputted from the channel estimating unit 106C-1, ..., 106C-M by a conjugate complex number of the same channel estimation in the reception branch of the same path outputted from the channel estimating unit 106-1, ..., 106-M. Due to this, the operation unit 108-1, ..., 108-M compensates for the phase rotation due to the fading variation undergone over the path, and outputs a complex-number signal containing the amplitude or power information due to fading variation and an amplitude variation and phase variation by each branch. An adder 109C adds together the output signals of the operation units 108-1, ..., 108-M. Namely, by the operation units 108-1, ..., 108-M and the adder 109C, RAKE composition is made on the channel estimation values of the paths outputted from the channel estimation units 106C-1, ..., 106C-M.

A correction-value detecting unit 110 compares between the output signal of the adder 109 and the output signal of the adder 109C, to thereby detect an amplitude variation and phase rotation on the reception branch relative to that of the calibration branch. The detection result provides a correction value. A correction-value memory unit 111 previously stores correction values which is as the output of the correction-value detecting unit 110, on a reception branch-by-reception branch basis.

The inter-array signal compositing unit 112 makes an inter-array compositing process, by the use of the signal from each reception branch and the receiving-branch based correction value of the correction value memory unit 111. There are some approaches concerning the inter-array signal compositing way in the inter-array signal compositing unit 112, and the reception-weight generating technique in array synthesis. For example, there are a reception-weight generating technique based on the least-squares error method, and a reception-weight generating technique by estimating an arrival direction of receiving signal and forming a directive beam for the estimated direction, and so on. Specifying is not made herein to the techniques. However, where there is a necessity of correction for the amplitude and phase deviations occurring between the reception branches during generating a reception weight, used is the correction value stored in the correction-value memory unit 111.

Explanation is made on one example of a correction-value detecting process, by using (Equation 1) to (Equation 7). In this consideration, the interference and noise components are assumably neglected on the reception signal in order to simplify explanation.

Now, the selector control unit 113 is assumably under control to select the n-th antenna. For the signal propagated through the m-th path, the channel estimation value detected in the channel estimating unit 106-m is expressed as (Equation 1).

$$h_{n,m} = Z_n \cdot F_m \quad (1)$$

Herein, Zn represents an amplitude variation and phase rotation based on the n-th reception branch. Also, Fm represents an amplitude variation and phase rotation due to the fading variation undergone over the m-th path. The power detecting unit 107-m has an output as given in (Equation 2).

$$x_{n,m} = h_{n,m} \cdot h^*_{n,m} = |Z_n|^2 \cdot |F_m|^2 \quad (2)$$

Provided that the adder 109 has an output Xn, it can be expressed as (Equation 3).

$$X_n = \sum_{m=1}^{M} x_{n,m} = |Z_n|^2 \cdot \sum_{m=1}^{M} |F_m|^2 \quad (3)$$

This is true for the calibration branch. For the signal propagating through the m-th path, the channel estimation value detected in the channel estimating unit 106C-m can be expressed as (Equation 4).

$$h_{cal,m} = Z_{cal} \cdot F_m \quad (4)$$

Herein, Zcal represents an amplitude variation and phase rotation based on the calibration branch. The operation unit 108-m has an output as (Equation 5).

$$y_{n,m} = h_{cal,m} \cdot h^*_{n,m} = Z_{cal} \cdot Z^*_n \cdot |F_m|^2 \quad (5)$$

Provided that the adder 109C has an output Yn, it can be given as (Equation 6).

$$Y_n = \sum_{m=1}^{M} y_{n,m} = Z_{cal} \cdot Z^*_n \cdot \sum_{m=1}^{M} |F_m|^2 \quad (6)$$

The correction-value detecting unit 110 detects a variation on the reception branch relative to that of the calibration branch by the use of the outputs of the adder 109 and adder 109C. The result provides a correction value. The correction value, if assumed C, can be expressed as (Equation 7).

$$C_n = \frac{Y_n}{X_n} = \frac{Z_{cal} \cdot Z^*_n}{|Z_n|^2} \quad (7)$$

The correction-value memory unit 111 stores the correction values Cn detected according to (Equation 7) by the correction-value detecting unit 110. The correction value Cn is stored on a reception branch-by-reception branch basis.

Selecting control of reception branch is made by the selector control unit 113, to carry out the above correction-value detecting process on all the reception branches. This can detect a correction value for correcting for the amplitude and phase deviations occurring between the reception branches.

Next, explained is a method of correcting between the reception branches in the inter-array signal compositing unit 112. The inter-array signal compositing unit 112 detects reception data by using a signal from each reception branch and a correction value of the correction-value memory unit 111.

Figure 3:
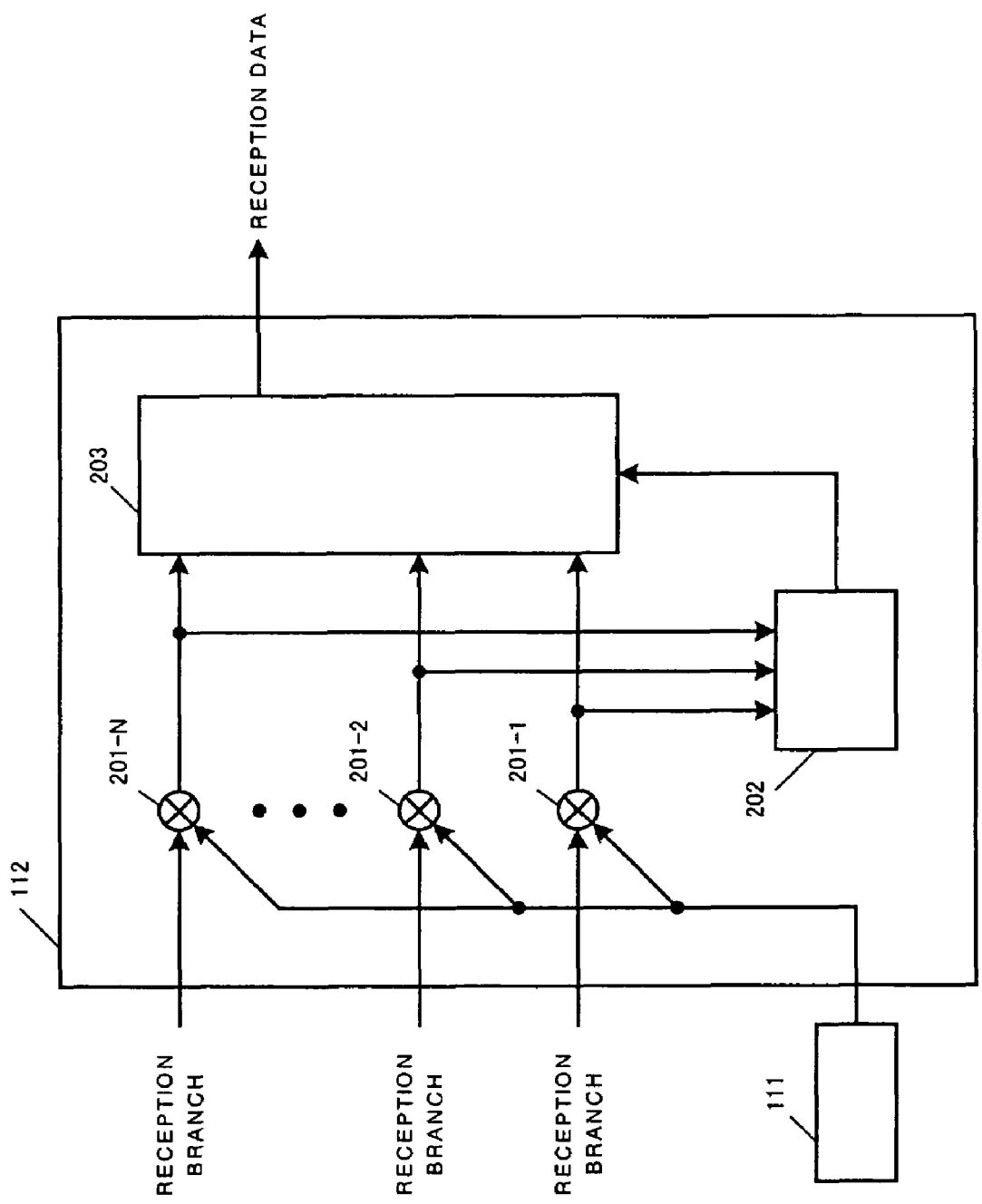
FIG. 3 is a block connection diagram showing one example of an inter-array signal compositing unit in the radio communication apparatus according to embodiment 1 of the invention.

Explanation is made on the method of correcting for the deviation between the reception branches by the inter-array signal compositing unit 112, with using FIG. 3.

FIG. 3 is a block connection diagram of the inter-array signal compositing unit 112. Multipliers 201-1, 201-2, ..., 201-N each multiply a correction value corresponding to each reception branch from the correction-value memory unit 111 on the signal from the reception branch. This can correct for the amplitude and phase deviations of the signal received at the antenna suffered from the reception branch. A weight generating unit 202 generates a reception weight by using an output signal of the multiplier 201-1, 201-2, . . . , 201-N. A weight multiplier-and-adder 203 makes a weighting on the output signals of the multipliers 201-1, 201-2, . . . , 201-N by using a weight generated by the weight generating unit 202, and then compositing the weighted signals together. The combined signal is outputted as reception data.

Figure 1:
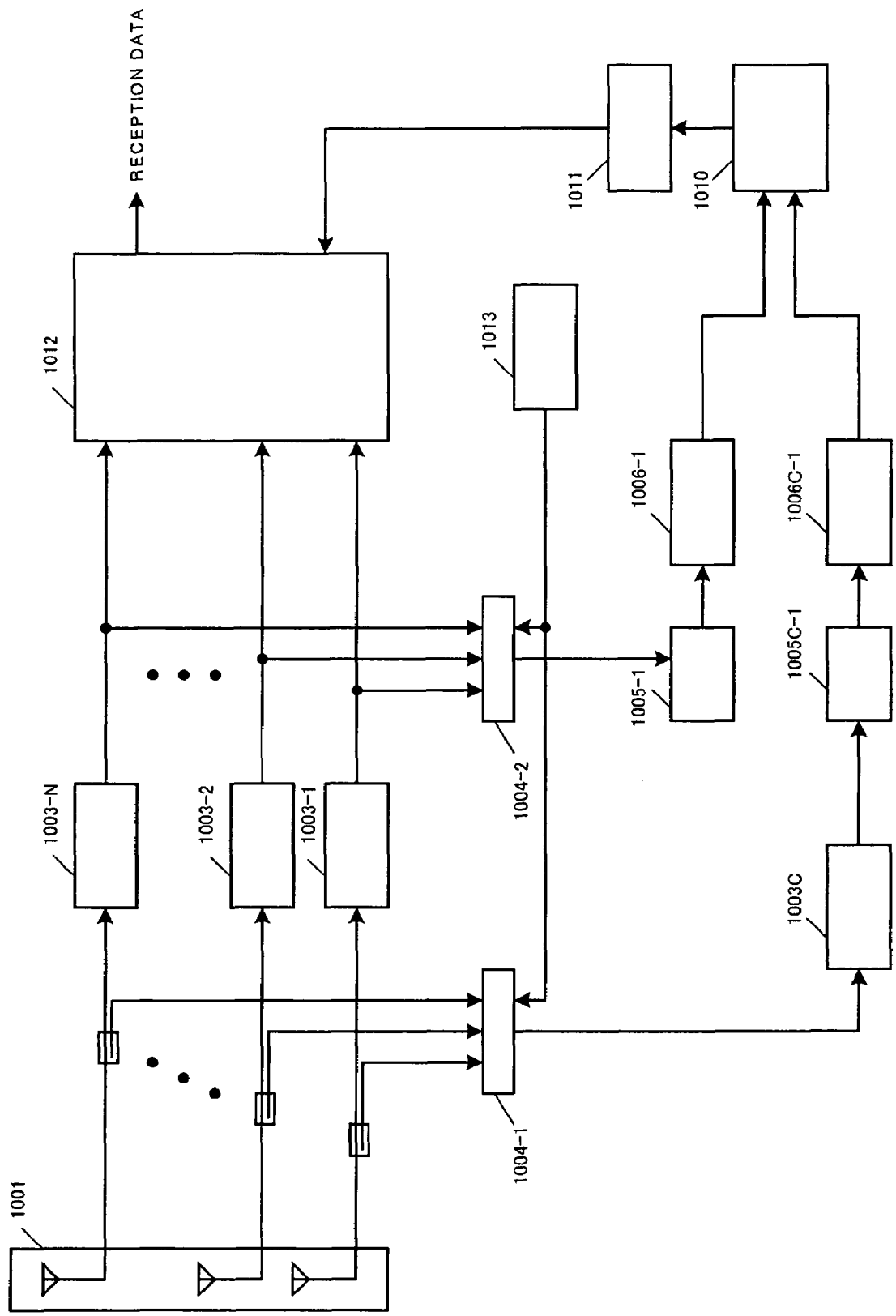
FIG. 1 is a block connection diagram of a radio communication apparatus according to a related art.

Herein, comparison is made between the correction-value detecting process shown in the present embodiment 1 and the correction-value detecting process shown in the related art. The detection process of the related art in one example is explained by using the block configuration diagram shown in FIG. 1 and (Equation 8) to (Equation 11). The reception signal herein is shown by neglecting the interference and noise components thereof in order to simplify the explanation.

The selector control unit 1013 is assumably under control to select the n-th antenna. Meanwhile, the signal has assumably propagated through the m-th path.

For the reception signal transmitted through the radio circuit section 1003-N, the channel estimating unit 1006-1 detects a channel estimation value expressed as (Equation 8).

$$h_{n,m} = Z_n \cdot F_m \quad (8)$$

Herein, Zn represents an amplitude variation and phase rotation based on the n-th reception branch. Also, Fm represents an amplitude variation and phase rotation due to the fading variation undergone upon signal propagation.

This is true for the calibration branch. For the reception signal transmitted through radio circuit section 1003C, the channel estimation value detected in the channel estimating unit 106C-1 can be expressed as (Equation 9).

$$h_{cal,m} = Z_{cal} \cdot F_m \quad (9)$$

Herein, Zcal represents an amplitude variation and phase rotation based on the calibration branch.

The correction-value detecting unit 1010 detects a variation on the reception branch relative to that of the calibration branch by the use of the channel estimation value of (Equation 8) and the channel estimation value of (Equation 9). The result provides a correction value. The correction value, if assumed C, can be expressed as (Equation 10).

$$C_{n,m} = \frac{h_{cal,m}}{h_{n,m}} = \frac{Z_{cal} \cdot Z_n^*}{|Z_n|^2} \quad (10)$$

In order to provide the same condition as that in the invention of embodiment 1, there is a need to provide a plurality of paths for use in detecting a correction value. By averaging with the plurality of paths, the correction value C can be expressed as (Equation 11).

$$C_n = \frac{1}{M} \sum_{m=1}^{M} C_{n,m} = \frac{Z_{cal} \cdot Z_n^*}{|Z_n|^2} \quad (11)$$

In the meanwhile, the fading variations Fm of reception signal in the channel estimation values shown in (Equation 8) and (Equation 9) are instantaneous variations, varying independently of the paths. Due to this, even if there are a plurality of paths, accuracy improvement is impossible even by such a process as compositing or averaging the channel estimation values.

Meanwhile, the correction value Cm can be determined by division, as shown in (Equation 10). In division, the poor accuracy of a denominator, conspicuously deteriorates post-division accuracy. In this manner, it is impossible for the related art to improve the accuracy by using a plurality of paths prior to division.

On the contrary, the invention of the embodiment 2 is allowed to improve the accuracy by compositing a plurality of paths together prior to division, as shown in (Equation 3) and (Equation 6). It can be seen from this that, by improving the denominator accuracy in division, there is an effect to suppress the conspicuous deterioration in post-division accuracy.

Figure 4:
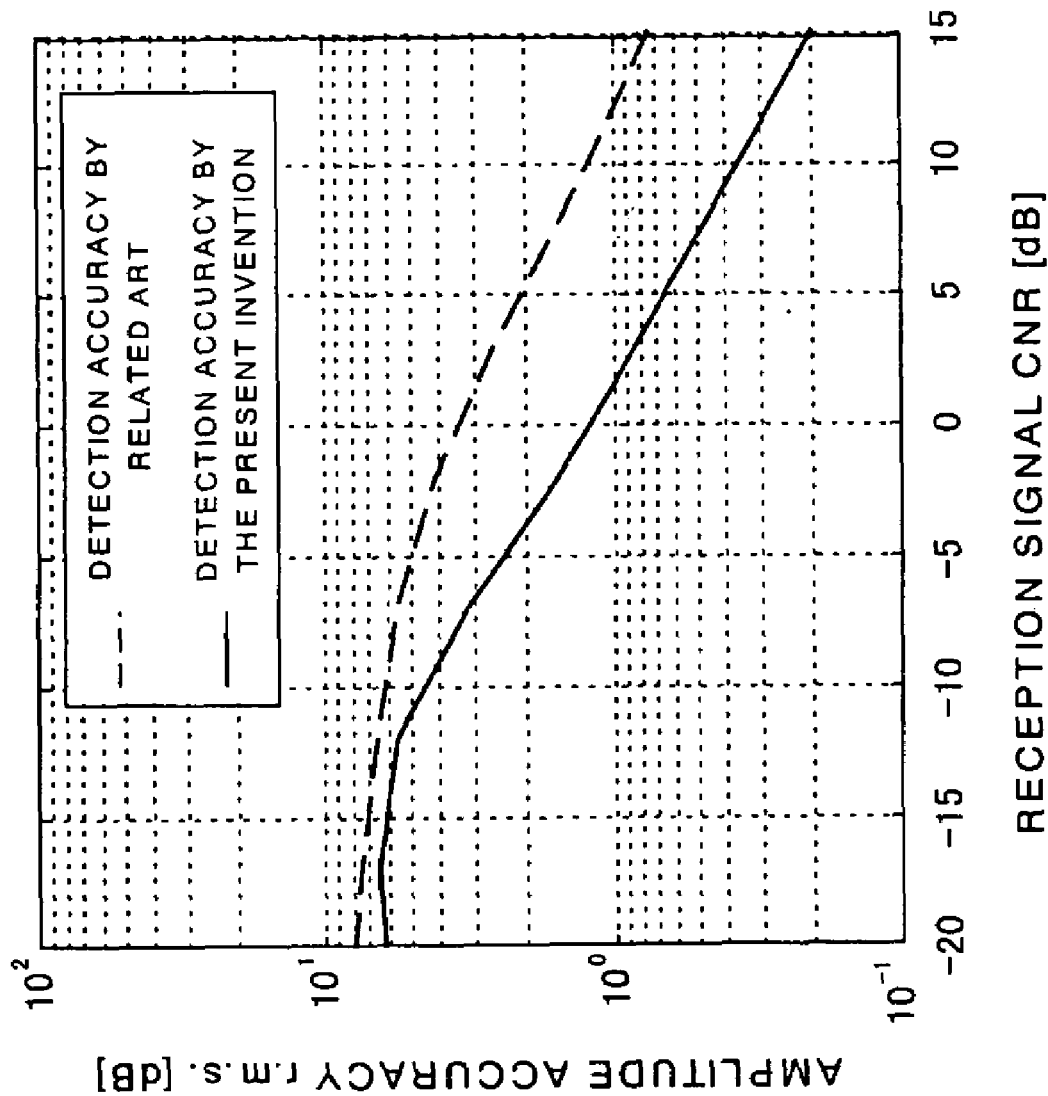
FIG. 4 is a graph showing an amplitude accuracy in correction value detection of the radio communication apparatus according to embodiment 1 of the invention.
Figure 5:
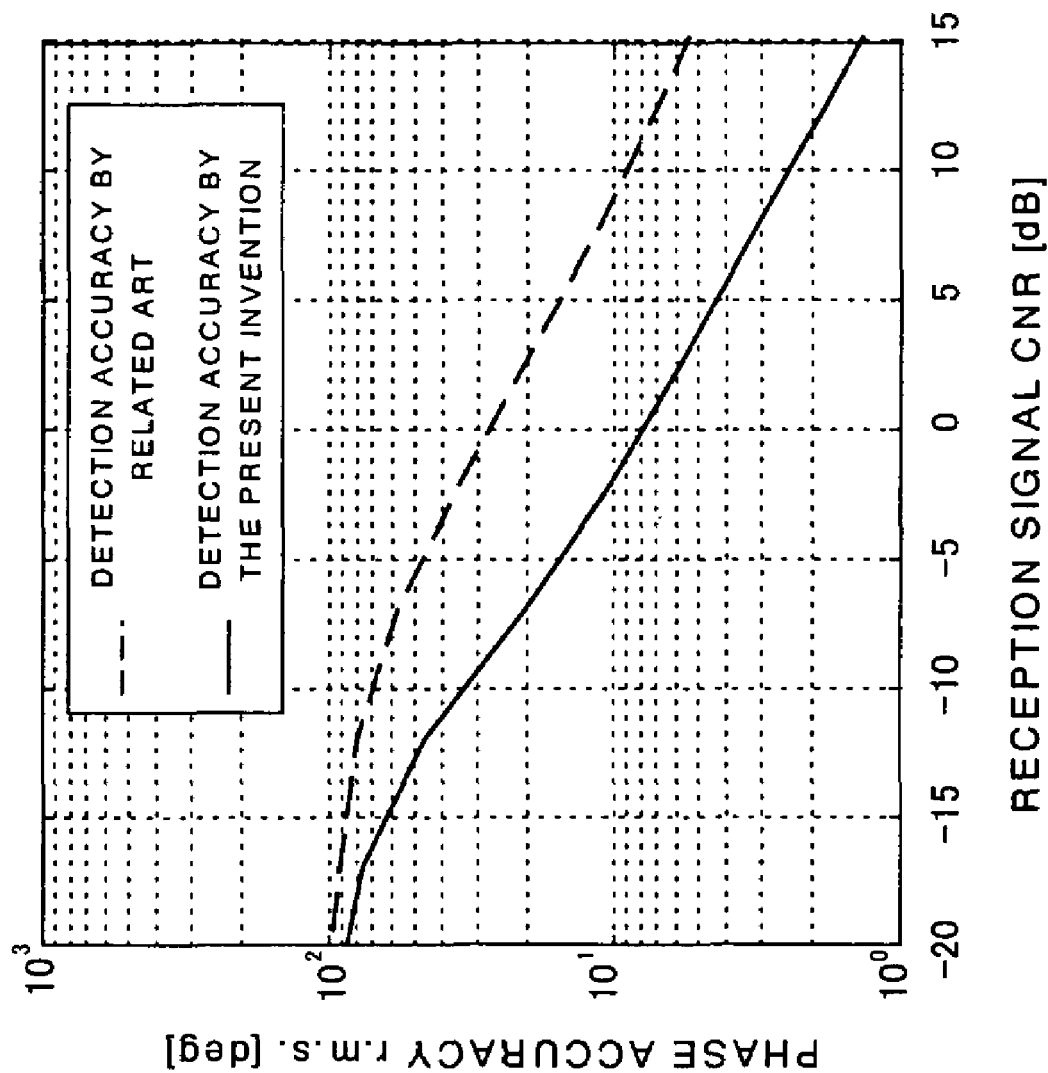
FIG. 5 is a graph showing a phase accuracy in correction value detection of the radio communication apparatus according to embodiment 1 of the invention.

Now, the correction-value detecting accuracy in the invention of the embodiment 1 is compared with the related art, by taking one example. Comparison is made by showing the correction-value detecting accuracy based on computer simulations. FIGS. 4 and 5 are examples of correction-value detecting accuracy based on computer simulations. The condition of simulation is assumably based on that the signal is a direct-spread-schemed CDMA signal, the paths arriving at the reception antenna is in the number of 12, each path has a delay time of one chip relative to the first received path, and the mean reception power of the path attenuates exponentially. Also, it is assumed that the paths are independently in Rayleigh fading.

The power distribution unit 102-1,102-2, . . . , 102-N distributes a slight power of the reception signal and sends the distributed part of power to the calibration branch. It is assumed herein that a power signal lower than the reception power by 10-dB is distributed and conveyed to the calibration branch. Also, the correction value in the invention of embodiment 1 is assumably detected according to (Equation 7). Herein, the paths for use in detecting a correction value is taken eight in the number. The correction value in the related art is assumably detected according to (Equation 11).

FIG. 4 shows an amplitude accuracy of the detected correction value while FIG. 5 shows a phase accuracy of the detected correction value. In FIGS. 4 and 5, the solid line represents a detection accuracy according to the invention of embodiment 1 while the broken line a detection accuracy according to the related art.

From the simulation results shown in FIGS. 4 and 5, it can be seen that the detection accuracy according to the invention of embodiment 1 is improved by 5–10 dB, in respect of the accuracy of amplitude and phase, over the detection accuracy according to the related art.

In this manner, even where detecting a correction value by the use of a plurality of paths similarly in the invention of embodiment 1 and the related art, it can be seen that the detection accuracy is greatly improved by RAKE composition as in the invention of embodiment 1.

According to the invention of this embodiment, it is possible to detect a correction value for correcting an amplitude/phase deviation occurring between the reception branches by the use of a reception-branch channel estimating value and calibration-branch channel estimation value. On this occasion, by carrying out a RAKE composition, the accuracy in correction-value detection can be improved by path diversity gain.

Incidentally, in this embodiment, the signal for calibration uses a signal of from a mobile station under communication. Accordingly, as the mobile station, a mobile station exclusive for calibration may be prepared beforehand to carry out calibration using the signal from the mobile station.

Meanwhile, in the above explanation, the output signals of the radio circuit sections 103-1, 103-2, . . . , 1-3-N are inputted to the selector unit 104-2, from which one is selected and outputted according to a signal from the selector control unit 113. The invention is not limited to this, i.e. a correlator and a channel estimating unit may be provided in each reception branch so that a channel estimation value on one reception branch can be selected from the channel estimation values on the reception branches.

Meanwhile, the correction-value memory unit 111 can be used for initial state correction upon turning on the power to the radio communication apparatus, by measuring and storing the amplitude and phase deviations between the reception branches in the stage of fabricating or setting up the array antenna or radio communication apparatus.

In the case that the radio communication signal uses an OFDM signal, the similar effect to that of this embodiment can be obtained by carrying out a correlation operation in the correlators 105-1, 105-2, . . . , 105-N in a manner to output OFDM signals to the respective paths. For example, there is a method that the correlators 105-1, 105-2, . . . , 105-N make a correlation operation with the known symbols of OFDM signal.

Meanwhile, although the above explained the configuration having a calibration branch separately from the reception branches, correction is possible by using one of the reception branches for a calibration branch. In this case, the array antenna is made in a state the reception branches are absent of one branch.

Meanwhile, in this embodiment, because the correlators 105-1, 105-2, . . . , 105-N and channel estimating units 106-1, 106-2, . . . , 106-N on the reception branch are the same as the correlator 105C and channel estimating unit 106C on the calibration branch, those may be configured for common use. In such a case, the reception-branch signal outputted from the selector unit 104-2 and the calibration-branch signal outputted from the radio circuit section 103C are stored for a constant time, to make time-divisionally a correlation operation and channel-estimating process. Otherwise, the reception-branch signal outputted from the selector unit 104-2 and the calibration-branch signal outputted from the radio circuit section 103C may be switched over for a slight time, to effect a correlation operation and channel-estimating process.

Meanwhile, concerning correlation operation in the correlator 105-1, 105-2, . . . , 105-N, channel estimating process in the channel estimating units 106-1, 106-2, . . . , 106-N and 106C, power detecting process in the power detecting unit 107-1, 107-2, . . . , 107-N, operation process in the operating unit 108-1, 108-2, . . . , 108-N, adding operation in the adder 109 and 109C, and correction-value detecting operation in the correction-value detecting unit 110, these can be implemented with signal processing by computer program description.

2. Second Exemplary Embodiment

Figure 6:
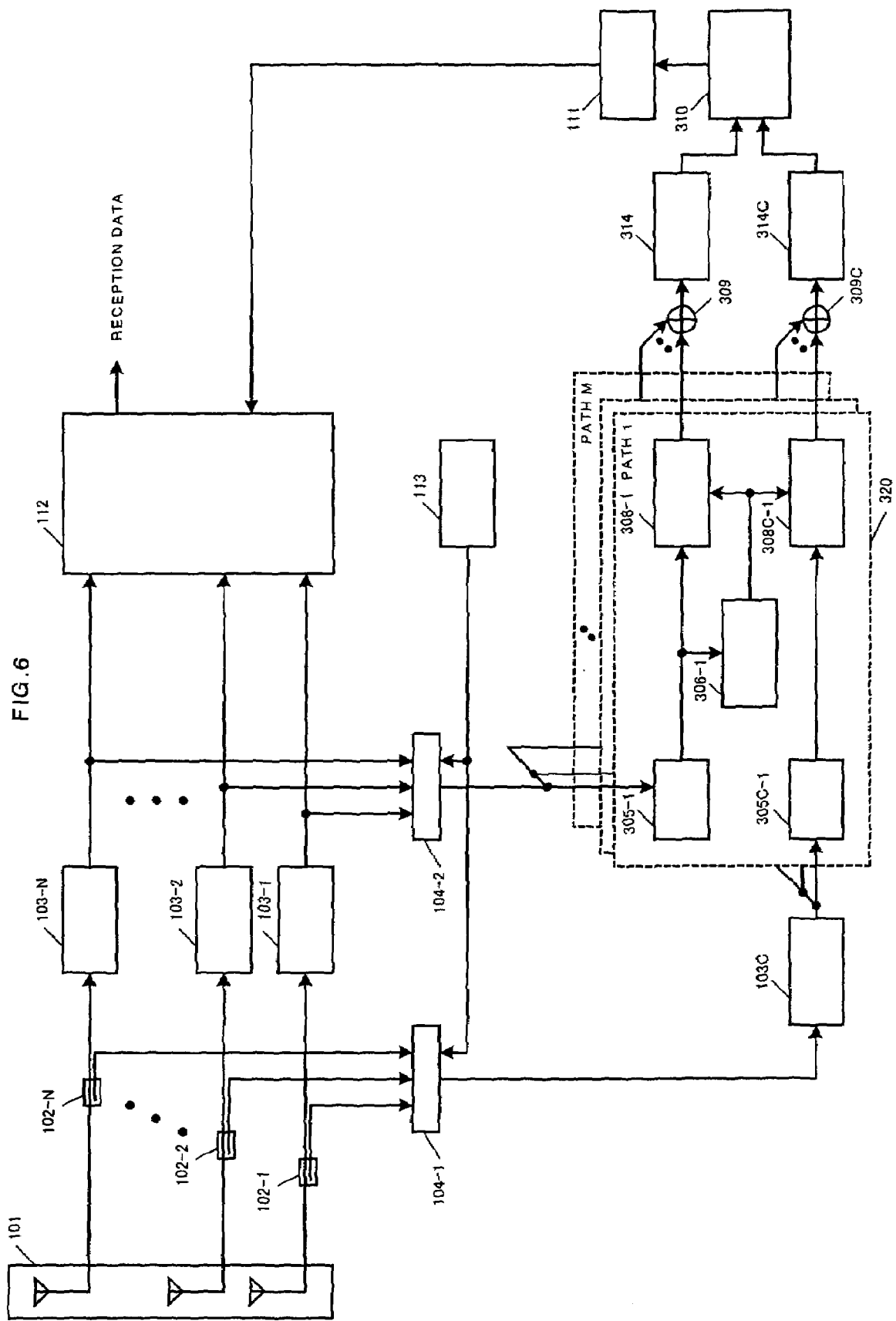
FIG. 6 is a block connection diagram of a radio communication apparatus according to embodiment 2 of the invention.

FIG. 6 is a block connection diagram of a radio communication apparatus according to embodiment 2 of the invention. This embodiment is for the case that the signal originated from the mobile station contains a signal known by the base station, e.g. a pilot signal. The difference from the configuration of FIG. 2 lies in the configuration of an amplitude/phase deviation detecting system 320 and in a correlator 314, 314C connected to the output of the adder 309, 309C. Explained below is the difference from the embodiment 1.

A channel estimating unit 306-1, 306-2, . . . , 306-N detects a channel estimating value on the reception branch by the use of an output of a correlator 305-1, 305-2, . . . , 305-N. An operating unit 308-1, 308-2, . . . , 308-N multiplies the output of the correlator 305-1, 305-2, . . . , 305-N by a conjugate complex number of a channel estimation value of the same path outputted from the channel estimating unit 306-1, 306-2, . . . , 306-N. An adder 309 adds the output signals of the operating units 308-1, 308-2, . . . , 308-N together. Namely, by the operating unit 308-1, 308-2, . . . , 308-N and the adder 309, RAKE composition is made on the channel estimation values on the paths outputted from the correlators 305-1, 305-2, . . . , 305-N. A correlator 314 takes a correlation on the signal outputted from the adder 309, by means of a known signal, such as a pilot signal, thereby outputting a correlated value.

Meanwhile, an operating unit 308C-1, 308C-2, 308C-N multiplies the output of the correlator 305C-1, 305C-2, . . . , 305C-N by a conjugate complex number of a channel estimation value of the same-path reception branch. An adder 309C adds the output signals of the operating units 308C-1, 308C-2, . . . , 308C-N together, to carry out a RAKE composition on the signals outputted from the correlators 305C-1, 305C-2, . . . , 305C-N. A correlator 314C takes a correlation on the signal outputted from the adder 309C, by means of a known signal, such as a pilot signal, thereby outputting a correlated value. A correction-value detecting unit 310 compares between the correlated value outputted from the correlator 314 and the correlated value outputted from the correlator 314C, to thereby detect the amplitude and phase variations on the reception branch relative to the calibration branch.

The other configuration and operation are similar to that of embodiment 1.

3. Third Exemplary Embodiment

Figure 7:
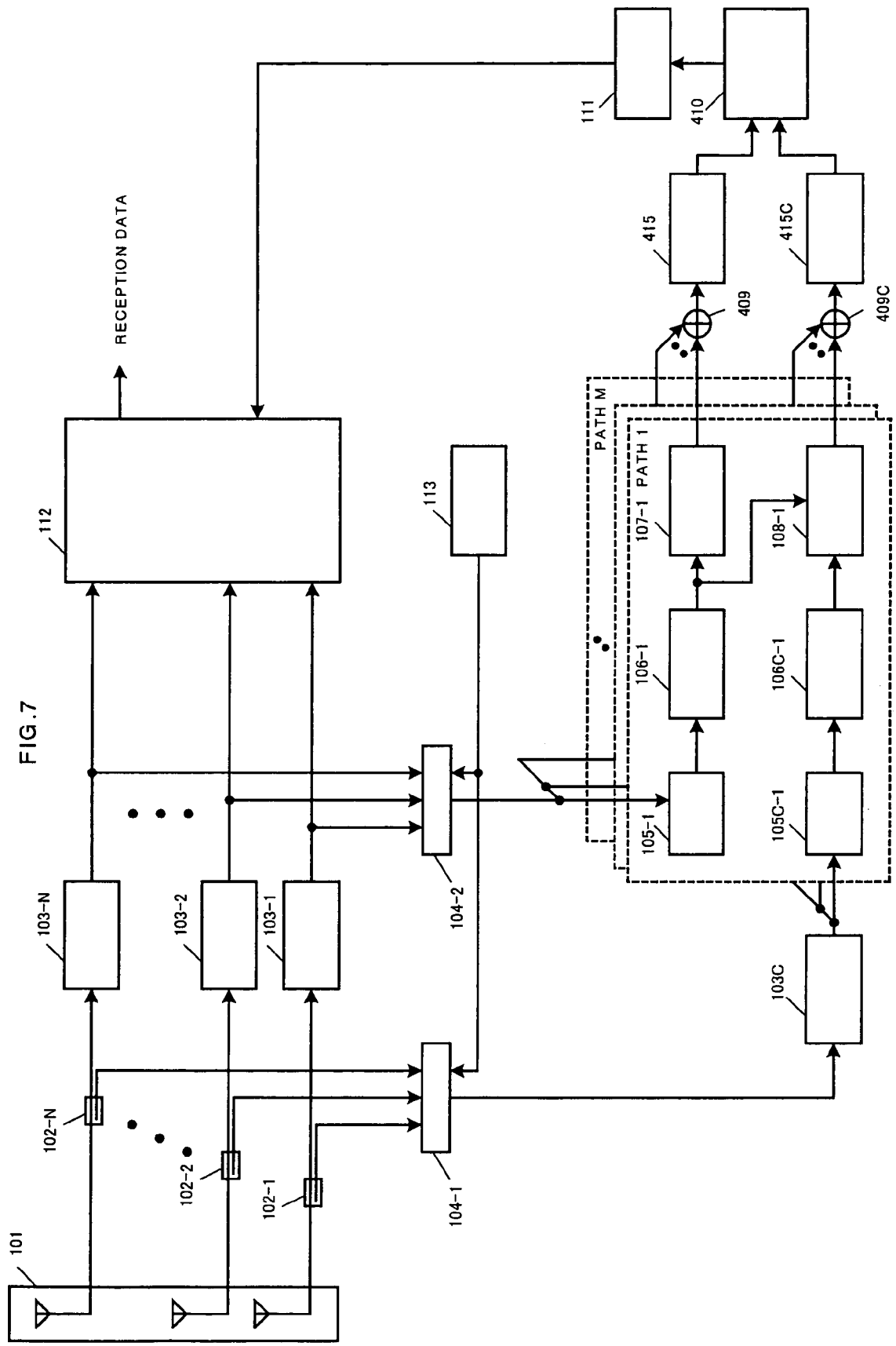
FIG. 7 is a block connection diagram of a radio communication apparatus according to embodiment 3 of the invention.

FIG. 7 is a block connection diagram of a radio communication apparatus according to embodiment 3 of the invention. The difference from the configuration of FIG. 2 lies in the connection of an averaging-in-time unit 415, 415C to the output of the adder 409, 409C. Explained below is the difference from the embodiment 1.

In case the process of correction-value detection in embodiment 1 is assumed once, the adder 409 outputs one signal in one process. In embodiment 3, this process is made a plurality of times. The averaging-in-time unit 415 stores the output signals of the adder 409, i.e. Xn in (Equation 3), over a plurality of times of processes, thereby carrying out an averaging-in-time process. The averaging-in-time unit 415C similarly stores the output signals of the adder 409C, i.e. Yn in (Equation 6), over a plurality of times of processes, thereby carrying out an averaging-in-time process. A correction-value detecting unit 410 compares between the output signal of the averaging-in-time unit 415 and the output signal of the averaging-in-time unit 415C, to thereby detect an amplitude variation and phase rotation on the reception branch relative to that of the calibration branch. The other configuration and operation are similar to that of embodiment 1.

The invention of embodiment 3 makes it possible to detect with further accuracy a correction value for correcting an amplitude and phase deviation occurring between the reception branches of the array antenna described in embodiment 1.

Incidentally, the averaging-in-time unit 415, 415C may take a moving average over a plurality of results or take an average by using a forgetting factor. This can improve the followability of variation in time of amplitude variation and phase rotation.

Meanwhile, because the output signal from the adder 409 and 409C is a complex-number signal, an amplitude and phase can be detected. Accordingly, a plurality of amplitudes and phases may be compared to remove the output signals small in amplitude or greatly different in phase rotation amount as results of low reliability. The other results are used, as results of high reliability, for the averaging process in the averaging-in-time unit 415 and 415C, enabling accurate detection of a correction value.

4. Fourth Exemplary Embodiment

Figure 8:
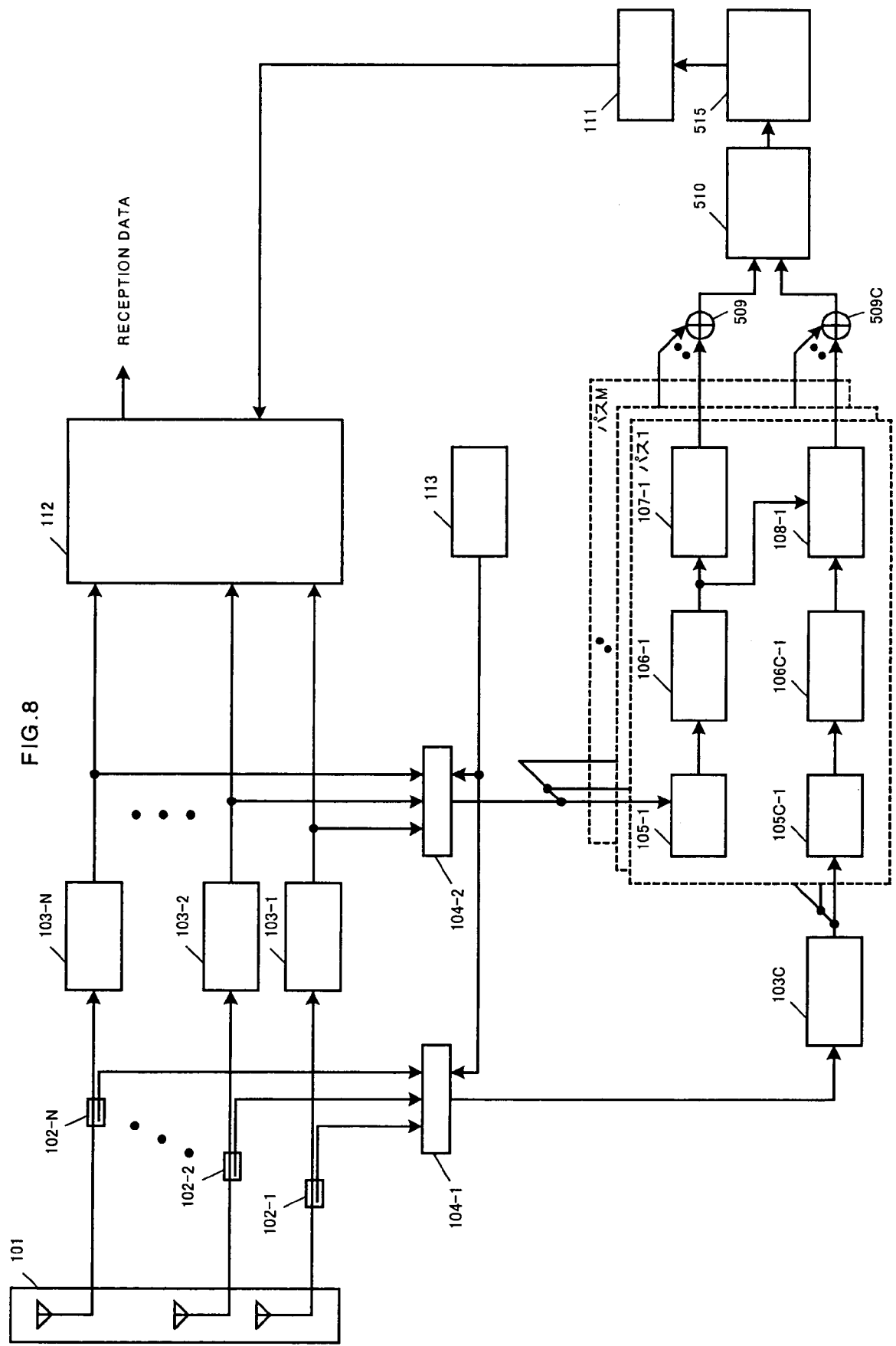
FIG. 8 is a block connection diagram of a radio communication apparatus according to embodiment 4 of the invention.

FIG. 8 is a block connection diagram of a radio communication apparatus according to embodiment 4 of the invention. The difference from the configuration of FIG. 7 explained in embodiment 3 lies in that the averaging-in-time unit 415, 415C shown in FIG. 7 is removed and averaging-in-time unit 515 is connected to the output of a correction-value detecting unit 510. Explained below is the difference from the embodiment 1.

In the configuration of FIG. 8, an averaging-in-time unit 515 is used for the output signal of the correction-value detecting unit 510, i.e. Cn in (Equation 7), instead of the output signal of the adder 509, 509C, thereby taking an average in time on the correction value which is an output signal. The other configuration and operation are similar to that embodiment 3.

5. Fifth Exemplary Embodiment

Figure 9:
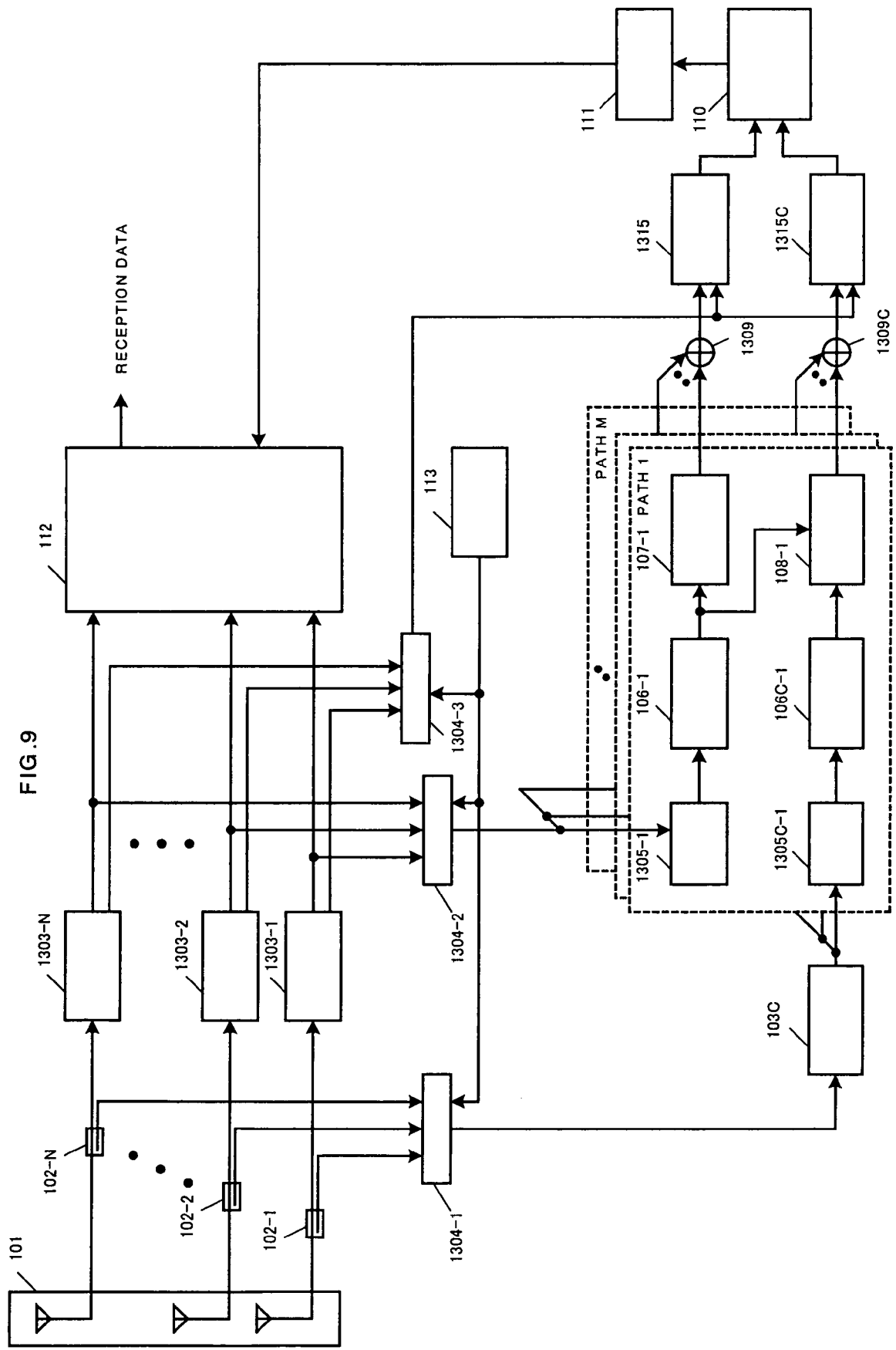
FIG. 9 is a block connection diagram of a radio communication apparatus according to embodiment 5 of the invention.

FIG. 9 is a block connection diagram of a radio communication apparatus according to embodiment 5 of the invention. This embodiment 5 takes an average in time by the use of control information of an automatic gain control amplifier circuit in each of the radio circuit sections 1303-1, 1303-2, . . . , 1303-N, thereby taking an average over a comparatively long time and detecting a correction value with practical accuracy. The difference from the configuration of FIG. 7 explained in embodiment 3 lies in the provision of a selector unit 1304-3. Explained below is the difference from the embodiment 1.

The selector unit 1304-3 selects any of the control information of from the automatic gain control amplifier circuits of the radio circuit sections 1303-1, 1303-2, . . . , 1304-N, while the averaging-in-time units 1315, 1315C carries out an averaging process using the control information of the automatic gain control amplifier circuits. When making an averaging process over a comparatively long time in the averaging-in-time 1315, 1315C, the amplification degree in the automatic gain control amplifier circuit changes depending upon a reception-signal power. At around the amplification degree change, the reliability in the output signal of the adders 1309 and 1309C differs. For example, if assuming a case that reception power decreases at a certain time point and amplification degree increases, the reception power increases but noise power also increases correspondingly. Accordingly, the output of the adder 1309, 1309C, after amplification degree is increased, is in a state noise power is increased. However, the averaging-in-time units 1305 and 1305C operates to suppress noise power, by adjusting power value to be small by using control information of the automatic gain control amplifier circuit. Consequently, even where averaging is made over a comparatively long time, a calibration correction value can be detected with accuracy. The other configuration and operation are similar to that of embodiment 3.

6. Sixth Exemplary Embodiment

Figure 10:
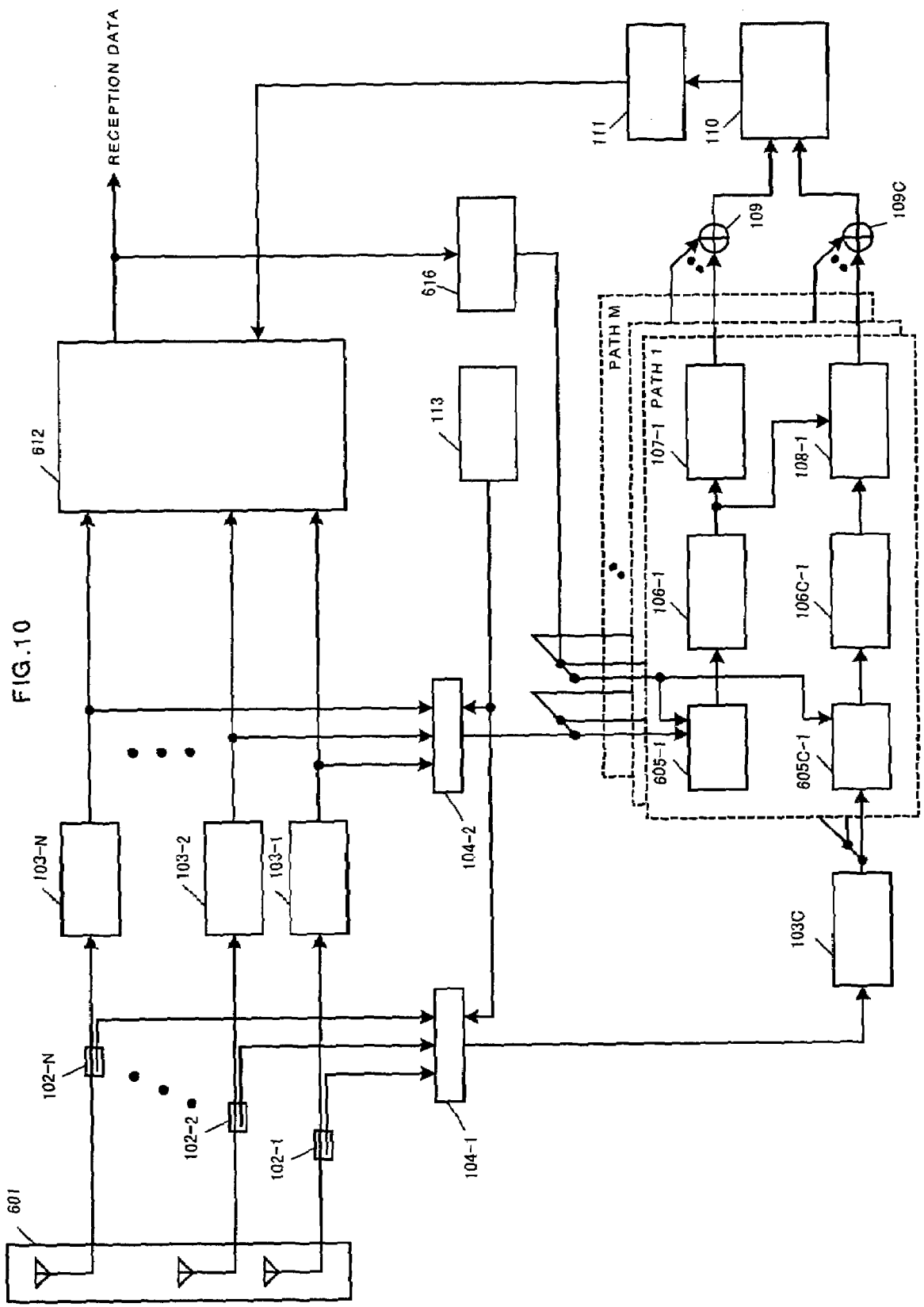
FIG. 10 is a block connection diagram of a radio communication apparatus according to embodiment 6 of the invention.

FIG. 10 is a block connection diagram of a radio communication apparatus according to embodiment 6 of the invention. The difference from the configuration of FIG. 2 lies in that a user control unit 616 is connected between the output of an inter-array signal compositing unit 612 and the correlators 605-1, 605-2, . . . , 605-N and correlators 605C-1, 605C-2, . . . , 605C-N. Explained below is the difference from the embodiment 1.

In the case that signals arrive at the array antenna 601 from a plurality of mobile stations, the inter-array signal compositing unit 612 carries out an inter-array compositing process on a user-by-user basis, thus outputting the data of a plurality of users. The outputted data are inputted to the user control unit 616 for extracting user-based reception power information. The user control unit 616 detects a user having a great reception power from the inputted user-based reception power information. In the correlators 605-1, 605-2, . . . , 605-N and correlators 605C-1, 605C-2, . . . , 605C-N, correlation operation is made to extract a reception signal of the user having a great reception power detected in the user control unit. The other configuration and operation are similar to those of embodiment 1.

According to the invention of embodiment 6, because detecting a correction value is possible by using a signal of a user having a great reception power, it is possible to accurately detect a correction value for correcting an amplitude and phase deviation occurring between the reception branches of the array antenna.

7. Seventh Exemplary Embodiment

Figure 11:
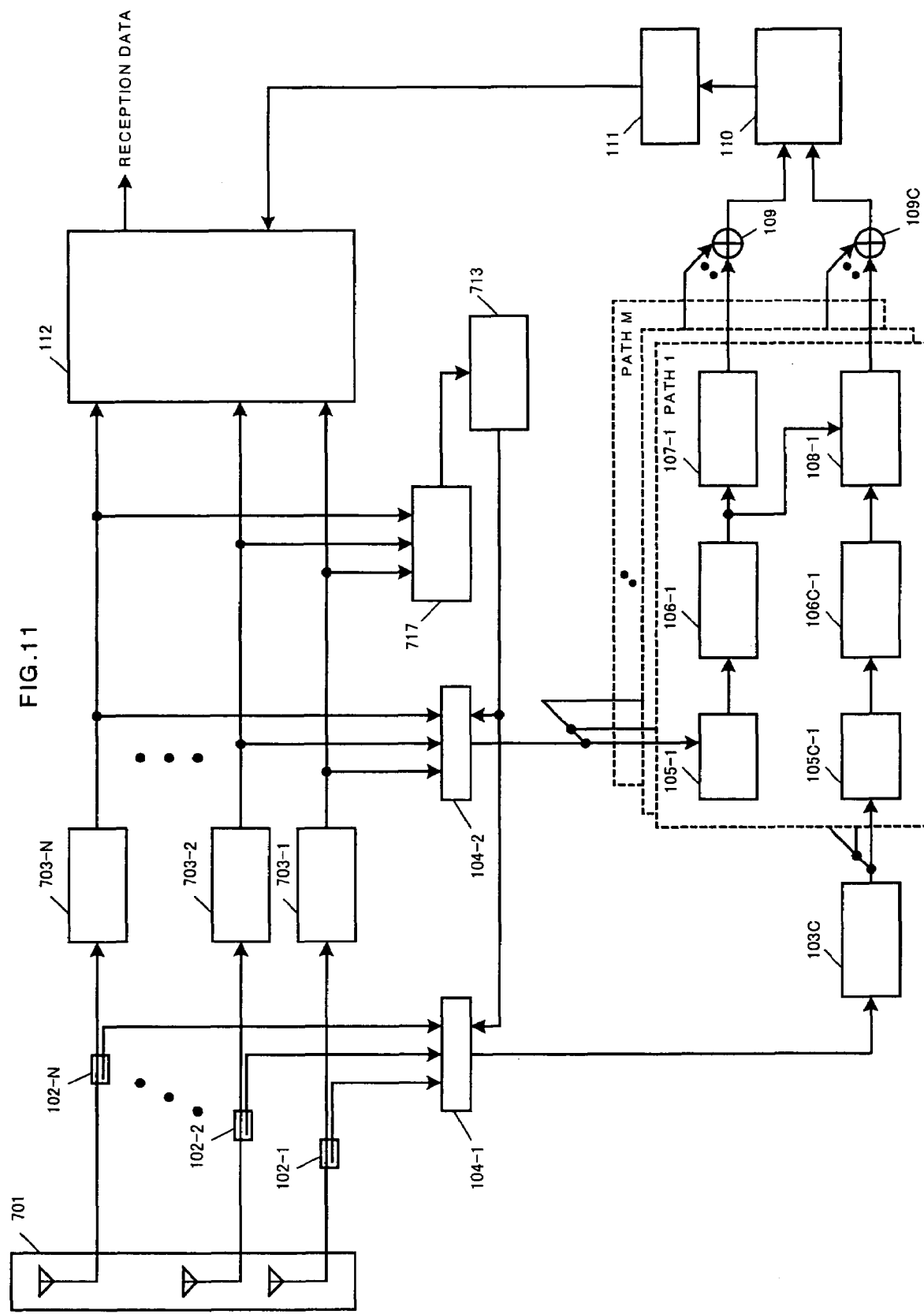
FIG. 11 is a block connection diagram of a radio communication apparatus according to embodiment 7 of the invention.

FIG. 11 is a block connection diagram of a radio communication apparatus according to embodiment 7 of the invention. The difference from the configuration of FIG. 2 lies in that a reception-power detecting unit 717 is connected between the radio circuit sections 703-1, 703-2, . . . , 703-N and a selector control unit 713. Explained below is the difference from the embodiment 1.

The reception-power detecting unit 717 inputs the output signal of the radio circuit sections 703-1, 703-2, . . . , 703-N on the reception branches, to detect a reception power on each reception branch. The selector control unit 713 uses the reception-branch-based reception power detected by the reception power detecting unit 717, thereby making a control to select a reception branch greater in reception power. Where the signals received at the array antenna 701 are different in reception power among the antenna elements, calibration is preferentially made on a reception branch greater in reception power. The other configuration and operation are similar to that of embodiment 1.

As in the above, according to the invention of embodiment 7, detecting a correction value is preferentially made for a reception branch greater in reception power. This makes it possible to accurately detect a correction value for correcting an amplitude and phase deviation occurring between the reception branches of the array antenna.

8. Eighth Exemplary Embodiment

Figure 12:
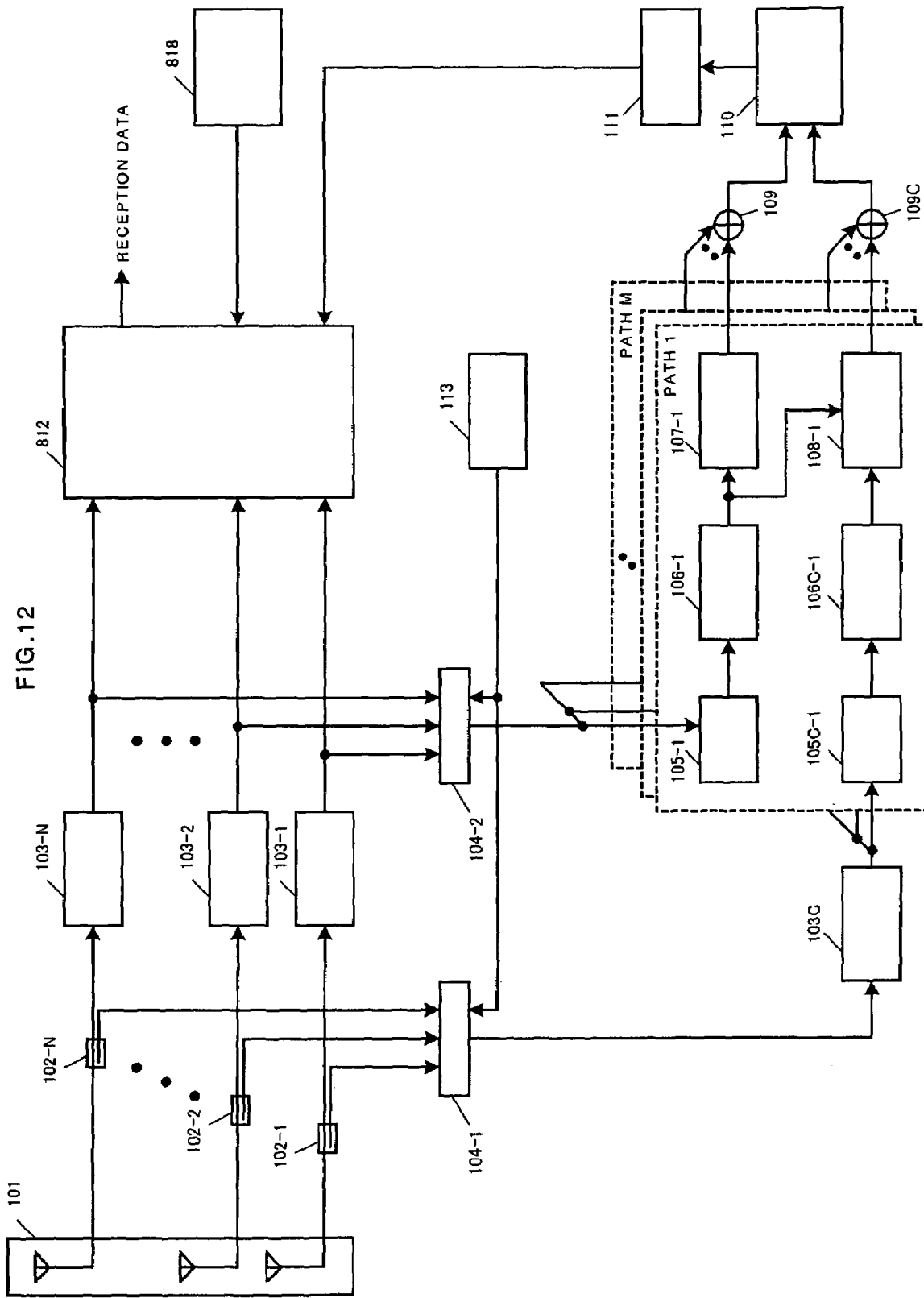
FIG. 12 is a block connection diagram of a radio communication apparatus according to embodiment 8 of the invention.

FIG. 12 is a block connection diagram of a radio communication apparatus according to embodiment 8 of the invention. The difference from the configuration of FIG. 2 lies in that an inter-array signal compositing unit 812 is connected with a mutual coupling correcting matrix memory unit 818. Explained below is the difference from the embodiment 1.

The mutual coupling correcting matrix memory unit 818 is stored with a correction matrix for correcting for mutual coupling on the array antenna. The inter-array signal compositing unit 812 makes a weight correction by using the correction matrix stored in the mutual coupling correcting matrix memory unit 818, in addition to the operation in embodiment 1 explained in FIG. 2. Herein, the correction matrix is a matrix for correcting for mutual coupling of the antenna. During antenna fabrication or upon connecting between the antenna and the base station apparatus, such a correction matrix is stored in the mutual coupling correcting matrix memory unit 818. There are various ways for deriving a correction matrix, e.g. described in the document "Calibration of a Smart Antenna for Carrying Out Vector Channel Sounding at 1.9 GHz" (Larocque et al, Wirel Pers Commun Emerg Technol Enhanc Commun p259–268, 1999). The other configuration and operation are similar to that of embodiment 1.

As in the above, according to the invention of embodiment 8, correction is possible for antenna mutual coupling, in addition to the effect of correcting for an amplitude/phase deviation occurring between the reception branches of the array antenna described in embodiment 1.

9. Ninth Exemplary Embodiment

Figure 13:
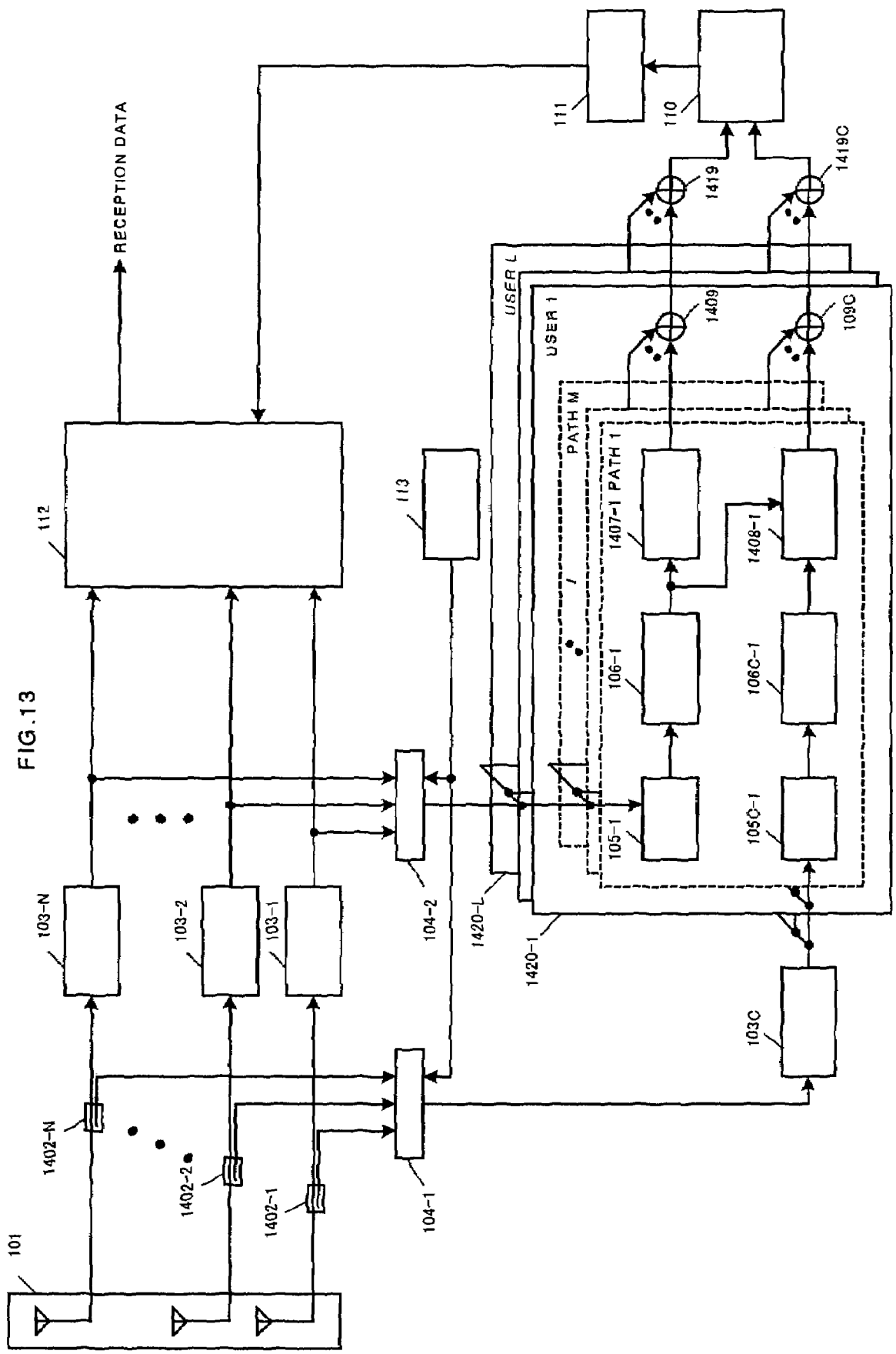
FIG. 13 is a block connection diagram of a radio communication apparatus according to embodiment 9 of the invention.

FIG. 13 is a block connection diagram of a radio communication apparatus according to embodiment 9 of the invention. The difference from the configuration of FIG. 2 lies in that there are provided M paths of user-based channel estimating blocks 1420 in the number of users of L having, as one unit, amplitude/phase deviation detecting systems 120 and adders 109, 109C in FIG. 2, and user-to-user signal compositing units 1419, 1419C for compositing the outputs of power detecting unit 1407-1, 1407-02, . . . , 1407-L and operating unit 1408-1, 1408-02, . . . , 1408-L of the user-based channel estimation processing blocks 1420-1, 1420-02, . . . , 1402-L. Explained below is the difference from the embodiment 1.

In the status that the radio communication apparatus is communicating with a plurality of mobile stations, the user-based channel estimation processing blocks 1420-1, 1420-02, . . . , 1402-L makes a channel estimating process on a user-by-user basis. The channel estimating process is similar in basic operation to embodiment 1, i.e. Xn of (Equation 3) and Yn of (Equation 6) are outputted in the user-based channel estimating process block 1420-1, 1420-02, . . . , 1402-L. The user-based channel estimating process block 1420-1, 1420-02, . . . , 1402-L outputs Xn and Yn not including a phase rotation resulting from an instantaneous fading variation in the reception signal. Zn representative of an amplitude variation and phase rotation due to the reception branch is included equally for each user. Similarly, Zcal representative of an amplitude variation and phase rotation due to the calibration branch is also included equally for each user.

Consequently, the user-to-user signal compositing unit 1419 adds and combines together Xn outputted from the user-based channel estimating process block 1420-1, 1420-02, . . . , 1402-L. Meanwhile, the user-to-user signal compositing unit 1419C adds and combines together Yn outputted from the user-based channel estimating process block 1420-1, 1420-02, . . . , 1402-L. The other configuration and operation are similar to that of embodiment 1.

As described above, the invention of embodiment 9, because of detecting a correction value by the use of the signals from a plurality of users in communications, can accurately detect a correction value for correcting an amplitude and phase deviation occurring between the reception branches of the array antenna.

Incidentally, the users whose outputs are composited in the user-to-user signal compositing units 1419 and 1419C may be all the users in communications or some persons selected from the users in communications. The method for selecting users for output combination, for example, may detect reception powers of the respective users in the user-based channel estimating process blocks 1420-1, 1420-02, . . . , 1402-L and select users in the order of greater reception power, or detected SIRs (signal-to-interference power ratio) on the respective users and select users in the order of greater detected SIR.

Meanwhile, a user control unit may be provided as in embodiment 6 explained in FIG. 10 so that user-based information of reception power and reception SIR can be detected from the output of the inter-array signal compositing unit, thereby controlling the users whose signals are to be composited by using the detection information.

Meanwhile, it is possible to provide an averaging-in-time unit as in embodiment 4. By carrying out an averaging-in-time process on the output of the adder of the adder 1409 or adder, accurate detection of a correction value is possible.

What is claimed is:

1. A radio communication apparatus having an array antenna made up by a plurality of antenna elements and an inter-array signal compositing unit for compositing signals received at the antenna elements together, the radio communication apparatus comprising:
    a first radio circuit section for conveying the signals received at the antenna elements to the inter-array signal compositing unit;
    a second radio circuit section for conveying the received signals;
    a first channel estimating unit for determining a channel estimation value of a signal conveyed through the first radio circuit section;
    a second channel estimating unit for determining a channel estimation value of a signal conveyed through the second radio circuit section;
    a power detecting unit for detecting a power from an output of the first channel estimating unit;
    an operating unit for detecting an amplitude ratio and phase rotation amount from outputs of the first and second channel estimating units; and
    a correction-value detecting unit for detecting a correction value for correcting an amplitude deviation and phase deviation occurring on the first and second radio circuit sections, from outputs of the power detecting unit and operating unit.

2. A radio communication apparatus according to claim 1, wherein the first radio circuit section, the second radio circuit section, the power detecting unit and the operating unit are provided in plurality correspondingly to the antenna elements, and comprise a plurality of first correlators for detecting the signals conveyed through the plurality of first radio circuit sections as signals arrived in different timing and outputting the detected signals to the first channel estimating unit, a plurality of second correlators for detecting the signals conveyed through the plurality of second radio circuit sections as signals arrived in different timing and outputting the detected signals to the second channel estimating unit, a first adder for adding outputs of the plurality of power detecting units together, and a second adder for adding outputs of the plurality of operating units together, the correction-value detecting unit detecting a correction value from outputs of the first and second adders.

3. A radio communication apparatus according to claim 2, further comprising a first selector unit for selecting one out of signals outputted from the plurality of first radio circuit sections, a plurality of power distributing units for distributing a power from the antenna elements of the array antenna, a second selector unit for selecting one out of signals outputted from the plurality of power distributing unit and outputting a selected signal to the second radio circuit section, and a selector control unit for selecting, with control, the signal received at the same antenna element from signals outputted from the first and second selector units.

4. A radio communication apparatus according to claim 3, wherein the selector control unit makes control on the first and second selector units in a manner of selecting signals in one of a predetermined order, a desired order, a predetermined time interval and a desired time interval.

5. A radio communication apparatus according to claim 3, further comprising a correction-value memory unit for storing correction-value outputted from the correction-value detecting unit, separately for the antenna elements selected by the first selector unit and second selector unit, the inter-array signal compositing unit making an inter-array signal compositing process by using the correction values respectively for the antenna elements.

6. A radio communication apparatus according to claim 5, further comprising a mutual coupling correcting matrix memory unit for previously storing a correction matrix for correcting the array antenna for antenna mutual coupling, an inter-array signal compositing process being made to output reception data by using signals outputted from the plurality of radio circuit sections on the reception branches, reception-branch-based correction values stored in the correction-value memory unit, and the correction matrix stored in the mutual coupling correcting matrix memory unit.

7. A radio communication apparatus according to claim 3, further comprising a reception-power detecting unit for detecting powers of the signals received at the antenna elements of the array antenna, power information detected by the reception-power detecting unit is used to make a control such that a reception branch is selected by the first and second selector units.

8. A radio communication apparatus according to claim 7, wherein the first and second selector units are placed under control to preferentially select a reception branch having a greater reception power.

9. A radio communication apparatus according to claim 2, further comprising a first averaging-in-time unit for taking an average in time of output signals of one of the power detecting unit and the first adder, and a second averaging-in-time unit for taking an average in time of output signals of one of the operating unit and the second adder, the first and second averaging-in-time unit storing a plurality of signals outputted from the adder in one process thereby making an averaging process in time.

10. A radio communication apparatus according to claim 2, further comprising an averaging-in-time unit for taking an average in time of output signals of the correction-value detecting unit, the averaging-in-time unit storing a plurality of signals outputted from the correction-value detecting unit in one correction-value detecting process thereby making an averaging process in time.

11. A radio communication apparatus according to claim 2, further comprising a user control unit for detecting a user greater in reception power out of output signals of the inter-array signal compositing unit, the user control unit making a user control such that correlation operation is carried out on a detected user by the first and second correlators.

12. A radio communication apparatus having an array antenna made up by a plurality of antenna element and an inter-array signal compositing unit for compositing signals received at the antenna elements together, the radio communication apparatus comprising:
  a first radio circuit section for conveying the signals received at the antenna elements to the inter-array signal compositing unit;
  a second radio circuit section for branching and conveying the received signals;
  a channel estimating unit for determining a channel estimation value of a signal conveyed through the first radio circuit section;
  a first operating unit for multiplying a conjugate complex number of the channel estimation value on a same path outputted from the channel estimating unit;
  a second operating unit for multiplying a conjugate complex number of the channel estimation value for a reception branch on a same path as one taken a correlation with a known signal conveyed through the second radio circuit section; and
  a correction-value detecting unit for detecting a correction value for correcting an amplitude deviation and phase deviation occurring in the first and second radio circuit sections, from outputs of the first and second operating units.

13. A radio communication apparatus according to claim 12, wherein the first radio circuit section, the second radio circuit section, and the first and second operating units are provided in plurality correspondingly to the antenna elements, and comprise a plurality of first correlators for separately detecting the signals conveyed through the plurality of first radio circuit sections as signals arrived at different timing and outputting the detected signals to the first channel estimating unit, a plurality of second correlators for separately detecting the signals conveyed through the plurality of second radio circuit sections as signals arrived at different timing and outputting the detected signals to the second channel estimating unit, a first adder for adding outputs of the plurality of first operating units together, a second adder for adding outputs of the plurality of second operating units together, and third and fourth correlators for taking correlations with known signals on output signals of the first and second adders, the correction-value detecting unit comparing between an output of the third correlator and an output of the fourth correlator thereby detecting an amplitude variation and phase variation over the reception branch.

14. A radio communication apparatus comprising:
  an array antenna having a plurality of antenna elements;
  a first radio circuit section for conveying signals received at the antenna elements to an inter-array signal compositing unit;
  a first selector unit for selecting any of signals conveyed through the first radio communication section;
  a second selector unit for selecting any of the signals received at the array antenna;
  a second radio circuit section for conveying a signal selected by the second selector unit;
  a correction-value detecting unit for detecting an amplitude deviation and phase deviation occurring at the first radio circuit section, by using a signal selected by the first selector unit and a signal conveyed through the second circuit section;

a plurality of first correlators for detecting separately a plurality of paths different in propagation delay time from the signal conveyed through the first circuit section;

a plurality of first channel estimating units for determining channel estimation values of the respective paths detected by the first correlators;

a plurality of second correlators for detecting separately a plurality of paths same as the first correlators from the signals conveyed through the second radio circuit section;

a plurality of second channel estimating units for determining channel estimation values of the respective paths detected by the second correlators;

a plurality of power detecting units for detecting path-based powers from outputs of the first channel estimating units;

a plurality of multiplying unit for multiplying a conjugate complex number of the output of the first channel estimating unit on a same path as the output of the second channel estimating unit;

a first adder for adding outputs of the plurality of power detecting units together; and a second adder for adding outputs of the plurality of multiplying units together.

15. A radio communication apparatus according to claim 14, further comprising a selector control unit for controlling a signal selected by the first and second selector units, the selector control unit being placed under control to select a signal outputted from the first selector unit and a signal outputted from the second selector unit that are signals received at the same antenna element.

16. A radio communication apparatus according to claim 15, wherein the selector control unit is placed under control to select signals in one of a predetermined order, a desired order, a predetermined time interval and a desired time interval.

17. A radio communication apparatus according to claim 15, further comprising a reception-power detecting unit for detecting powers of the signals received at the antenna elements of the array antenna, power information detected by the reception-power detecting unit being used to make a control to select a reception signal by the selector control unit.

18. A radio communication apparatus according to claim 17, wherein the selector control unit preferentially selects an antenna element conveying a signal having a greater reception power.

19. A radio communication apparatus according to claim 14, further comprising a correction-value memory unit for separately storing correction values outputted from the correction-value detecting unit, based on an antenna element selected by the first and second selector units, inter-array signal compositing process being made by using antenna-element-based correction value stored in the correction-value memory unit.

20. A radio communication apparatus according to claim 19, further comprising a mutual coupling correcting matrix memory unit for previously storing a correction matrix for correcting the array antenna for antenna mutual coupling, an inter-array signal compositing process being made by using signals outputted from the plurality of first radio circuit sections, reception-branch-based correction values stored in the correction-value memory unit, and the correction matrix stored in the mutual coupling correcting matrix memory unit.

21. A radio communication apparatus according to claim 14, further comprising a first averaging-in-time unit for taking an average in time of output signals of one of the power detecting unit and the first adder, and a second averaging-in-time unit for taking an average in time of output signals of one of the multiplying unit and the second adder, and the first and second averaging-in-time unit take an average of a plurality of signals outputted from the first and second adders in one process.

22. A radio communication apparatus according to claim 14, further comprising an averaging-in-time unit for taking an average in time of output signals of the correction-value detecting unit, and the first and second averaging-in-time unit take an average of a plurality of signals outputted from the correction-value detecting unit in one process.

23. A radio communication apparatus according to claim 14, further comprising a user control unit for detecting a user greater in reception power out of output signals of the inter-array signal compositing unit, the user control unit making a user control such that correlation operation is carried out on a detected user by the first and second correlators.

24. A radio communication apparatus according to claim 14, having a plurality of process blocks each of which is configured by the plurality of first and second correlators, the plurality of first and second channel estimating units, the plurality of power detecting units, the plurality of operating units and the first and second adders, further comprising a first user compositing unit for compositing together outputs of the first adders in the process blocks and a second user compositing unit for compositing together outputs of the second adders in the process blocks, the process blocks making a process on a user-by-user basis, the first and second user compositing units correcting a correction value by using a result of user composition.

* * * * *